US012699170B2

(12) United States Patent
Brown et al.

(10) Patent No.: US 12,699,170 B2
(45) Date of Patent: Aug. 4, 2026

(54) UWB-BASED INTENT DETECTION FOR SEAMLESS ACCESS

(71) Applicant: Schlage Lock Company LLC, Carmel, IN (US)

(72) Inventors: David Brown, Greenwood, IN (US); Ryan C. Kincaid, Indianapolis, IN (US); Joseph Land, Danville, IN (US)

(73) Assignee: Schlage Lock Company LLC, Carmel, IN (US)

( * ) Notice: Subject to any disclaimer, the term of this patent is extended or adjusted under 35 U.S.C. 154(b) by 441 days.

(21) Appl. No.: 17/567,707

(22) Filed: Jan. 3, 2022

(65) Prior Publication Data

US 2023/0213637 A1     Jul. 6, 2023

(51) Int. Cl.
*G01S 13/02* (2006.01)
*G01S 5/02* (2010.01)
(Continued)

(52) U.S. Cl.
CPC ........ *G01S 13/0209* (2013.01); *G01S 5/0294* (2013.01); *G01S 13/346* (2013.01);
(Continued)

(58) Field of Classification Search
CPC .. G01S 13/0209; G01S 13/346; G01S 13/526; G01S 13/588; G01S 5/0294;
(Continued)

(56) References Cited

U.S. PATENT DOCUMENTS 6,720,861 B1    4/2004  Rodenbeck et al.
8,319,605 B2   11/2012  Hassan et al.
(Continued)

FOREIGN PATENT DOCUMENTS

CN        102906360 A      1/2013
CN        107945316 A      4/2018
(Continued)

OTHER PUBLICATIONS

Du, Y., Zhang, X., & Nie, Z. (2019). A Real-Time Collision Avoidance Strategy in Dynamic Airspace Based on Dynamic Artificial Potential Field Algorithm. IEEE Access, 7, 169469-169479. https://doi.org/10.1109/ACCESS.2019.2953946 (Year: 2019).*
(Continued)

*Primary Examiner* — Resha Desai
*Assistant Examiner* — Remash R Guyah
(74) *Attorney, Agent, or Firm* — Taft Stettinius & Hollister LLP

(57) ABSTRACT

A method according to an embodiment includes receiving UWB data by an access control device, performing predictive analysis on the UWB data to generate expected location data associated with a location of a mobile device, determining a velocity of the mobile device and a heading of the mobile device based on the UWB data, determining whether the mobile device is on course to a passageway associated with the access control device based on the velocity and the heading of the mobile device, performing state estimation to determine whether the mobile device is within a secure distance threshold from the passageway, wherein the secure distance threshold dynamically changes based on the velocity of the mobile device, and inferring ingress intent of a user of the mobile device in response to determining that the mobile device is within the secure distance threshold and on course to the passageway.

19 Claims, 7 Drawing Sheets

(51) Int. Cl.

| | |
|---|---|
| *G01S 13/34* | (2006.01) |
| *G01S 13/526* | (2006.01) |
| *G01S 13/58* | (2006.01) |
| *G01S 13/76* | (2006.01) |
| *G07C 9/28* | (2020.01) |

(52) U.S. Cl.
CPC .......... *G01S 13/526* (2013.01); *G01S 13/588* (2013.01); *G07C 9/28* (2020.01); *G01S 13/765* (2013.01)

(58) Field of Classification Search
CPC ........ G01S 13/76; G01S 13/06; G01S 13/886; G01S 11/02; G01S 13/765; G01S 19/39; G01S 1/02; G01S 11/06; G07C 9/28; G07C 2209/63; G07C 9/00309; G07C 9/00896; G07C 9/00563; G07C 2009/00642; G07C 9/26; G07C 9/00174; G07C 9/00182; G07C 9/00904; G07C 9/10; G07C 9/21; G07C 9/22; G07C 9/257; G07C 9/27; G07C 9/29; G07C 2009/00333; G07C 2009/00357; G07C 2009/00769; G07C 2209/08; G07C 2209/61; G07C 9/00571; G07C 2009/00825; G07C 2009/00873; G07C 2009/00865; G07C 2009/0023; G07C 2209/64; G08B 13/2462; H04W 4/026; H04W 4/40; H04W 4/02; H04W 12/08; H04W 4/027; H04W 4/80; H04W 12/06; H04W 12/64; H04W 12/63; B60R 25/245; B60R 2325/20; H04B 17/21; H04B 17/318; H04B 17/0082; H04B 17/27; G06F 12/1458; G06N 3/08; G06Q 10/1095
USPC ............. 342/465, 357.25, 5.52; 340/5.7, 5.8, 340/5.61, 539.13, 5.64; 726/21
See application file for complete search history.

(56) References Cited

U.S. PATENT DOCUMENTS

| | | | |
|---|---|---|---|
| 9,196,104 | B2 | 11/2015 | Dumas et al. |
| 9,218,696 | B2 | 12/2015 | Dumas et al. |
| 9,336,637 | B2 | 5/2016 | Neil et al. |
| 9,378,598 | B2 | 6/2016 | Dumas et al. |
| 9,512,643 | B1 | 12/2016 | Keefe |
| 9,970,229 | B1 | 5/2018 | Favila et al. |
| 10,453,281 | B1 | 10/2019 | Lopez et al. |
| 10,619,380 | B2 | 4/2020 | Ahearn et al. |
| 10,719,999 | B2 | 7/2020 | Love et al. |
| 10,759,389 | B2 | 9/2020 | Ledvina et al. |
| 10,760,332 | B2 | 9/2020 | Kincaid et al. |
| 11,562,609 | B2 | 1/2023 | Prostko et al. |
| 11,663,864 | B2 | 5/2023 | Kincaid et al. |
| 2002/0067259 | A1 | 6/2002 | Fufidio et al. |
| 2005/0046546 | A1 | 3/2005 | Masudaya |
| 2006/0164208 | A1 | 7/2006 | Schaffzin et al. |
| 2009/0002246 | A1 | 1/2009 | Rabinovich et al. |
| 2010/0201482 | A1 | 8/2010 | Robertson et al. |
| 2012/0032850 | A1 | 2/2012 | Nakagawa et al. |
| 2012/0234058 | A1 | 9/2012 | Neil et al. |
| 2013/0176107 | A1 | 7/2013 | Dumas et al. |
| 2013/0237193 | A1 | 9/2013 | Dumas et al. |
| 2013/0241694 | A1 | 9/2013 | Sharma et al. |
| 2014/0148196 | A1 | 5/2014 | Bassan-Eskenazi et al. |
| 2014/0292481 | A1 | 10/2014 | Dumas et al. |
| 2015/0121465 | A1 | 4/2015 | Berns et al. |
| 2015/0213663 | A1 | 7/2015 | Dumas et al. |
| 2015/0309487 | A1 | 10/2015 | Lyman |
| 2016/0055692 | A1 | 2/2016 | Trani |
| 2016/0086400 | A1 | 3/2016 | Dumas et al. |
| 2016/0131750 | A1* | 5/2016 | Lu ............................ G01S 11/06 342/458 |
| 2016/0180620 | A1 | 6/2016 | Eyring et al. |
| 2016/0189453 | A1 | 6/2016 | Johnson et al. |
| 2016/0217638 | A1 | 7/2016 | Child et al. |
| 2016/0227362 | A1 | 8/2016 | Howard et al. |
| 2016/0307385 | A1 | 10/2016 | Arfwedson et al. |
| 2016/0332598 | A1 | 11/2016 | Ghabra et al. |
| 2016/0337863 | A1 | 11/2016 | Robinson et al. |
| 2016/0350992 | A1 | 12/2016 | Telljohann et al. |
| 2017/0303090 | A1* | 10/2017 | Stitt ........................ H04B 17/27 |
| 2017/0323093 | A1 | 11/2017 | Liu et al. |
| 2017/0372542 | A1 | 12/2017 | Romero et al. |
| 2018/0052217 | A1 | 2/2018 | Jonsson |
| 2018/0056939 | A1 | 3/2018 | van Roermund et al. |
| 2018/0102008 | A1 | 4/2018 | Dupart et al. |
| 2018/0162321 | A1 | 6/2018 | Spiess |
| 2018/0242105 | A1 | 8/2018 | Sute |
| 2018/0315262 | A1 | 11/2018 | Love et al. |
| 2019/0287329 | A1 | 9/2019 | Jonsson |
| 2020/0168017 | A1 | 5/2020 | Prostko et al. |
| 2020/0314651 | A1* | 10/2020 | Pirch ................... G06F 12/1458 |
| 2020/0349785 | A1 | 11/2020 | Kuenzi et al. |
| 2021/0158637 | A1 | 5/2021 | Kincaid et al. |
| 2023/0010267 | A1 | 1/2023 | Kincaid et al. |
| 2023/0213637 | A1 | 7/2023 | Brown et al. |

FOREIGN PATENT DOCUMENTS

| | | |
|---|---|---|
| EP | 2930071 A1 | 10/2015 |
| WO | 2014155255 A1 | 10/2014 |
| WO | 2016177666 A1 | 11/2016 |
| WO | 2017180563 A1 | 10/2017 |
| WO | 2017180688 A1 | 10/2017 |
| WO | 2018071671 A2 | 4/2018 |
| WO | 2020083750 A1 | 4/2020 |
| WO | 2020193566 A1 | 10/2020 |
| WO | WO-2020193580 A1 * | 10/2020 ............... G06N 3/09 |

OTHER PUBLICATIONS

International Search Report; International Searching Authority; International Application No. PCT/US2023/010029; May 4, 2023; 2 pages.

Written Opinion of the International Searching Authority; International Searching Authority; International Application No. PCT/US2023/010029; May 4, 2023; 3 pages.

Shikiar, A. et al., The Future of Authentication for the Internet of Things, FIDO Alliance, Mar. 28, 2017, https://fidoalliance.org/wpcontenVuploads/The_Future_of_Authentication_for_IoT_Webinar_170328_v10.pdf, 56 pages.

Developing Beacons with Bluetooth Low Energy (BLE) Technology; Silicon Laboratories; http://www.silabs.com/products/wireless/bluetooth/developing-beacons-with-bluetooth-low-energy-ble-technology; (last visited Apr. 27, 2017).

Angle of arrival; Wikipedia; https://en.wikipedia.org/wiki/Angle_of_arrival; (last visited Apr. 27, 2017).

What do you want to track? Whatever you want to track, Quuppa brings you the dot on the map.; Quuppa—Do More With Location; http://quuppa.com/; (last visited Apr. 27, 2017).

Indoor Location Positioning Technology: Research, Solutions & Trends; Grizzly Analytics; http://www.grizzlyanalytics.com/report_2015_02_indoor.html; (last visited Apr. 27, 2017).

Front Page—Car Connectivity Consortium; Car Connectivity Consortium; retrieved on Jan. 13, 2021; https://carconnectivity.org/; 6 pages.

Volkswagen and NXP Show First Car Using UWB to Combat Relay Theft; EE Times; retrieved on Jan. 13, 2021; https://www.eetimes.com/volkswagen-and-nxp-show-first-car-using-uwb-to-combat-relay-theft/; 4 pages.

Car thefts up 49% in five years following advent of keyless-entry technology; The Sunday Times Driving; retrieved on Jan. 13, 2021; https://www.driving.co.uk/news/many-cars-sale-today-risk-keyless-theft-new-research-finds/; 6 pages.

(56) References Cited

OTHER PUBLICATIONS

Front Page—UWB Alliance; UWB Alliance; retrieved on Jan. 13, 2021; https://uwballiance.org/; 11 pages.

Alliance Rallies UWB for Location Services; EE Times; retrieved on Jan. 13, 2021; https://www.eetimes.com/alliance-rallies-uwb-for-location-services/; 2 pages.

UWB Alliance to focus on interoperability, further boosting the UWB ecosystem; FierceWIreless; retrieved on Jan. 13, 2021; https://www.fiercewireless.com/wireless/uwb-alliance-to-focus-interoperability-further-boosting-uwb-ecosystem; 4 pages.

Front Page—FiRa Consortium; FiRa Consortium; retrieved on Jan. 13, 2021; https://www.firaconsortium.org/; 3 pages.

Introduction to the FiRa Consortium; FiRa Consortium; Aug. 1, 2019; 17 pages.

Ultra-Wideband (UWB) Gains Traction as a Sensing Technology Under New Industry Consortium; Forbes; retrieved on Jan. 13, 2021; https://www.forbes.com/...01/ultra-wideband-uwb-gains-traction-as-a-sensing-technology-under-new-industry-consortium/?sh=62102d366e21; 6 pages.

The Biggest iPhone News Is a Tiny New Chip Inside It; Wired; retrieved on Jan. 13, 2021; https://www.wired.com/story/apple-u1-chip/; 5 pages.

Apple built UWB into the iPhone 11. Here's what you need to know (FAQ); cnet; retrieved on Jan. 13, 2021; https://www.cnet.com/news/apple-built-uwb-into-the-iphone-11-heres-what-you-need-to-know-faq/; 6 pages.

Ultra-Wideband (UWB); NXP; retrieved on Jan. 13, 2021; https://www.nxp.com/applications/enabling-technologies/connectivity/ultra-wideband-uwb:UWB; 7 pages.

NXP Introduces Higher Security Using Ultra-Wideband Technology; Forbes; https://www.forbes.com/sites/tiriasresearch/2019/06/26/nxp-introduces-higher-security-using-ultra-wideband-technology/?sh=dc7565238410retrieved on Jan. 13, 2021; 5 pages.

Front Page—Decawave; Decawave; retrieved on Jan. 13, 2021; https://www.decawave.com/; 5 pages.

Australian Examination Report; IP Australia; Australian Application No. 2023204428; Jan. 18, 2025; 4 pages.

Canadian Examination Report; Canadian Intellectual Property Office; Canadian Patent Application No. 3,242,911; Nov. 8, 2024; 3 pages.

Australian Examination Report; IP Australia; Australian Application No. 2023204428; Apr. 15, 2025; 5 pages.

Extended European Search Report; European Patent Office; European Patent Application No. 23735180.4; Mar. 17, 2025; 10 pages.

Canadian Examination Report; Canadian Intellectual Property Office; Canadian Patent Application No. 3,242,911; Jul. 25, 2025; 3 pages.

Canadian Examination Report; Canadian Intellectual Property Office; Canadian Patent Application No. 3,242,911; Nov. 27, 2025; 5 pages.

New Zealand Examination Report 1 (Corrected); New Zealand Intellectual Property Office; New Zealand Patent Application No. 812825; Apr. 30, 2026; 4 pages.

* cited by examiner

UWB-BASED INTENT DETECTION FOR SEAMLESS ACCESS

BACKGROUND

Access control systems typically involve the use of credentials to manage the operation of an access control device (e.g., a lock device). Such credentials may be assigned to a particular user or device and are often physical in nature, forming at least a portion of, for example, a smartcard, proximity card, key fob, or token device. Thus, credential systems generally require an interaction between the credential and a reader device (e.g., on or secured to the access control device) such that the reader device may read the credential and determine whether access should be granted. In particular, a user may be required to swipe, tap, or otherwise present the credential to the reader device. As such, access control systems often require an active physical action on behalf of the user in order to grant the user access via the access control device.

SUMMARY

One embodiment is directed to a unique system, components, and methods for UWB-based intent detection for seamless access. Other embodiments are directed to apparatuses, systems, devices, hardware, methods, and combinations thereof for UWB-based intent detection for seamless access.

According to an embodiment, a method may include receiving, from an ultra wideband (UWB) subsystem of an access control device, UWB data indicative of a distance of a mobile device from the access control device and an angle of arrival of a UWB signal from the mobile device, performing, by the access control device, predictive analysis on the UWB data to generate expected location data associated with a location of the mobile device, determining, by the access control device, a velocity of the mobile device and a heading of the mobile device based on the UWB data, determining, by the access control device, whether the mobile device is on course to a passageway associated with the access control device based on the velocity and the heading of the mobile device, performing, by the access control device, state estimation to determine whether the mobile device is within a secure distance threshold from the passageway, wherein the secure distance threshold dynamically changes based on the velocity of the mobile device, and inferring, by the access control device, ingress intent of a user of the mobile device in response to determining that the mobile device is within the secure distance threshold and on course to the passageway.

In some embodiments, the method may further include calibrating the UWB data with a distance offset and an angle calibration.

In some embodiments, the method may further include filtering the UWB data to remove burst noise.

In some embodiments, performing the predictive analysis may include removing outlier data from the UWB data based on the expected location data.

In some embodiments, performing the predictive analysis may include applying a Kalman filter to generate the expected location data.

In some embodiments, determining the velocity of the mobile device may include determining an average velocity of the mobile device.

In some embodiments, determining the velocity of the mobile device may include determining the velocity of the mobile device based on historical location data calculated for the mobile device.

In some embodiments, the method may further include unlocking, by the access control device, a lock mechanism associated with the access control device in response to inferring ingress intent of the user.

In some embodiments, the access control device may be embodied as or include a reader device.

According to another embodiment, an access control device may include an ultra wideband (UWB) subsystem configured to perform a ranging session with a mobile device and generate UWB data indicative of a distance of the mobile device from the access control device and an angle of arrival of a UWB signal from the mobile device, a processor, and a memory comprising a plurality of instructions stored thereon that, in response to execution by the processor, causes the processor to receive the UWB data from the UWB subsystem, perform predictive analysis on the UWB data to generate expected location data associated with a location of the mobile device, determine a velocity of the mobile device and a heading of the mobile device based on the UWB data, determine whether the mobile device is on course to a passageway associated with the access control device based on the velocity and the heading of the mobile device, perform state estimation to determine whether the mobile device is within a secure distance threshold from the passageway, wherein the secure distance threshold dynamically changes based on the velocity of the mobile device, and infer ingress intent of a user of the mobile device in response to determining that the mobile device is within the secure distance threshold and on course to the passageway.

In some embodiments, the plurality of instructions may further cause the processor to calibrate the UWB data with a distance offset and an angle calibration.

In some embodiments, the plurality of instructions may further cause the processor to filter the UWB data to remove burst noise.

In some embodiments, to perform the predictive analysis may include to remove outlier data from the UWB data based on the expected location data.

In some embodiments, to perform the predictive analysis may include to apply a Kalman filter to generate the expected location data.

In some embodiments, to determine the velocity of the mobile device may include to determine an average velocity of the mobile device.

In some embodiments, to determine the velocity of the mobile device may include to determine the velocity of the mobile device based on historical location data calculated for the mobile device.

In some embodiments, the access control device may further include a lock mechanism configured to unlock in response to inferred ingress intent of the user.

In some embodiments, the access control device may further include a credential reader.

According to yet another embodiment, a method may include receiving, from an ultra wideband (UWB) subsystem of a mobile device, UWB data indicative of a distance of the mobile device to an access control device and an angle of arrival of a UWB signal from the access control device, performing, by the mobile device, predictive analysis on the UWB data to generate expected location data associated with a location of the mobile device relative to the access control device, determining, by the mobile device, a velocity of the mobile device and a heading of the mobile device based on the UWB data, determining, by the mobile device, whether the mobile device is on course to a passageway associated with the access control device based on the velocity and the heading of the mobile device, performing, by the mobile device, state estimation to determine whether the mobile device is within a secure distance threshold from the passageway, wherein the secure distance threshold dynamically changes based on the velocity of the mobile device, and inferring, by the mobile device, ingress intent of a user of the mobile device in response to determining that the mobile device is within the secure distance threshold and on course to the passageway.

In some embodiments, determining the velocity of the mobile device and the heading of the mobile device may be further based on sensor data from an inertial measurement unit of the mobile device.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
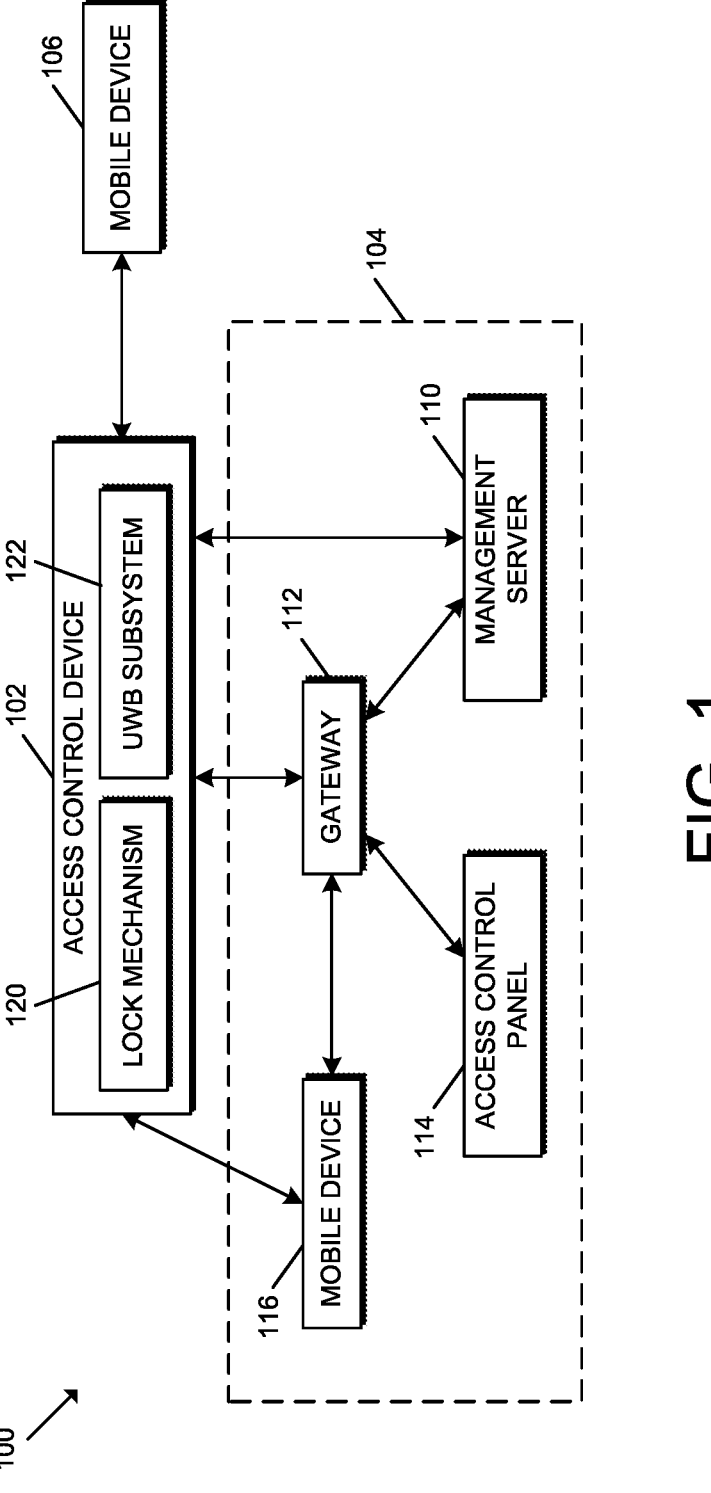
FIG. 1 is a simplified block diagram of at least one embodiment of an access control system for ultra wideband-based intent detection for seamless access.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

The terms longitudinal, lateral, and transverse may be used to denote motion or spacing along three mutually perpendicular axes, wherein each of the axes defines two opposite directions. The directions defined by each axis may also be referred to as positive and negative directions. Additionally, the descriptions that follow may refer to the directions defined by the axes with specific reference to the orientations illustrated in the figures. For example, the directions may be referred to as distal/proximal, left/right, and/or up/down. It should be appreciated that such terms may be used simply for ease and convenience of description and, therefore, used without limiting the orientation of the system with respect to the environment unless stated expressly to the contrary. For example, descriptions that reference a longitudinal direction may be equally applicable to a vertical direction, a horizontal direction, or an off-axis orientation with respect to the environment. Furthermore, motion or spacing along a direction defined by one of the axes need not preclude motion or spacing along a direction defined by another of the axes. For example, elements described as being "laterally offset" from one another may also be offset in the longitudinal and/or transverse directions, or may be aligned in the longitudinal and/or transverse directions. The terms are therefore not to be construed as further limiting the scope of the subject matter described herein.

Referring now to FIG. 1, in the illustrative embodiment, an access control system 100 for ultra wideband (UWB)-based intent detection for seamless access is shown. The illustrative access control system 100 includes an access control device 102, a management system 104, and a mobile device 106. Further, the management system 104 may include a management server 110, a gateway device 112, an access control panel 114, and/or a mobile device 116. Further, as shown, the illustrative access control device 102 includes a lock mechanism 120 and a UWB subsystem 122. However, in other embodiments, it should be appreciated that the access control device 102 may be embodied as a UWB accessory device configured to perform or facilitate the UWB-based intent detection described herein, which may be communicatively coupled to an electronic lock including a lock mechanism (e.g., such as the lock mechanism 120).

As described in detail below, the access control device 102 may control and/or facilitate access to a passageway (e.g., through a doorway) via a lock mechanism 120 based on an intent of the user of a mobile device 106 (e.g., a UWB-capable smartphone) inferred based on UWB communication signals received from the mobile device 106. In particular, the access control device may receive UWB data from the UWB subsystem 122 related to a UWB ranging session with the mobile device 106 and indicative of a distance of the mobile device 106 from the access control device 102 and an angle of arrival (AoA) of UWB signals received from the mobile device 106. As described below, the access control device 102 may perform various analyses on the UWB data and infer ingress intent of a user of the mobile device 106 if the mobile device 106 is on course to the passageway and within a dynamically changing secure distance threshold. If ingress intent is inferred, in some embodiments, the access control device 102 may automatically control the lock mechanism 120 without requiring user input or a physical action by the user (e.g., to unlock the lock mechanism 120).

It should be appreciated that the access control device 102, the management system 104, the mobile device 106, the management server 110, the gateway device 112, the access control panel 114, and/or the mobile device 116 may be embodied as any type of device or collection of devices suitable for performing the functions described herein.

More specifically, in the illustrative embodiment, the access control device 102 may be embodied as any type of device capable of controlling and/or facilitating access through a passageway (e.g., at least in part). For example, in various embodiments, the access control device 102 may be embodied as an electronic lock (e.g., a mortise lock, a cylindrical lock, or a tubular lock), an exit device (e.g., a pushbar or pushpad exit device), a door operator, an auto-operator, a motorized latch/bolt (e.g., for a sliding door), a barrier control device (e.g., battery-powered), or a peripheral controller of a barrier to a passageway. Accordingly, in some embodiments, the access control device 102 may include a lock mechanism 120 configured to be positioned in a locked state in which access to the passageway is denied, or positioned in an unlocked state in which access to the passageway is permitted. In some embodiments, the lock mechanism 120 includes a deadbolt, latch bolt, lever, and/or other mechanism adapted to move between the locked and unlocked state and otherwise perform the functions described herein. However, it should be appreciated that the lock mechanism 120 may be embodied as any another mechanism suitable for controlling access through a passageway in other embodiments.

Depending on the particular embodiment, the access control device 102 may include a credential reader or be electrically/communicatively coupled to a credential reader configured to communicate with the mobile device 106 and/or other credential devices. In some embodiments, the access control device 102 may have an access control database stored thereon for locally performing access control decisions associated with user access. Accordingly, in such embodiments, the access control database may store credential data, biometric data, historical information, PINs, passcodes, and/or other relevant authentication data associated with users. In other embodiments, such data or a portion thereof may be stored in a centralized access control database (e.g., hosted by and/or accessible to the management server 110).

As described herein, the access control device includes a UWB subsystem 122 for performing UWB ranging with other UWB-capable devices (e.g., the mobile device 106). In the illustrative embodiment, the UWB subsystem 122 includes a plurality of UWB antennas for wireless communication using UWB technology (e.g., using the IEEE 802.15.4 (wireless) standard). It should be appreciated that a UWB signal may be received by multiple UWB antennas, and the UWB subsystem 122 of the access control device 102 may calculate or estimate the distance and angle of arrival of the mobile device 106 based on the received UWB signal. It should be further appreciated that the number, size, and/or arrangement of UWB antennas of the UWB subsystem 122 may vary depending on the particular embodiment. Further, it should be appreciated that the access control device 102 may also include other wireless communication circuitry for communicating with the mobile device 106 and/or other devices via corresponding protocols (e.g., Wi-Fi, Bluetooth (e.g., including BLE), Zigbee, Z-Wave, Near Field Communication (NFC), Thread, etc.).

In the illustrative embodiment, the mobile device 106 may be embodied as any mobile device capable of communicating with the access control device 102 via UWB signals (e.g., for UWB ranging), exchanging credential information with the access control device 102, and/or otherwise performing the functions described herein. Accordingly, in some embodiments, in addition to having UWB communication circuitry, it should be appreciated that the mobile device 106 may also include other wireless communication circuitry for communicating with the access control device 102 and/or other devices via corresponding protocols (e.g., Wi-Fi, Bluetooth (e.g., including BLE), Zigbee, Z-Wave, Near Field Communication (NFC), Thread, etc.). It should be appreciated that, in some embodiments, the mobile device 106 may be embodied as a smartphone, UWB fob, or UWB tag device.

As described herein, in some embodiments, the mobile device 106 may be configured to perform the various functions described herein (see, for example, the method 300 of FIG. 3) in addition to or in the alternative to the access control device 102. Further, in some embodiments, the mobile device 106 may leverage sensor data to validate various data and/or otherwise improve the accuracy of the functions described herein. In particular, in some embodiments, the mobile device 106 may include an inertial measurement unit (IMU) including, for example, an accelerometer, gyroscope, and/or magnetometer that generates inertial data associated with the mobile device 106, which may be used to verify the velocity/heading of the mobile device 106. In other embodiments, the mobile device 106 may include environmental sensors (e.g., temperature sensors, air pressure sensors, humidity sensors, light sensors, etc.), inertial sensors (e.g., accelerometers, gyroscopes, etc.), magnetometers, proximity sensors, optical sensors, electromagnetic sensors, audio sensors (e.g., microphones), motion sensors, cameras, piezoelectric sensors, pressure sensors, switches (e.g., reed switches), and/or other types of sensors.

As described herein, the management system 104 may be configured to manage credentials of the access control system 100. For example, the management system 104 may be responsible for ensuring that the access control devices 102 have updated authorized credentials, whitelists, blacklists, device parameters, and/or other suitable data. Additionally, in some embodiments, the management system 104 may receive security data, audit data, raw sensor data, and/or other suitable data from the access control devices 102 for management of the access control system 100. In some embodiments, one or more of the devices of the management system 104 may be embodied as an online server or a cloud-based server. Further, in some embodiments, the management system 104 may communicate with multiple access control devices 102 at a single site (e.g., a particular building) and/or across multiple sites. That is, in such embodiments, the management system 104 may be configured to receive data from access control devices 102 distributed across a single building, multiple buildings on a single campus, or across multiple locations.

It should be appreciated that the management system 104 may include one or more devices depending on the particular embodiment of the access control system 100. For example, as shown in FIG. 1, the management system 104 may include a management server 110, a gateway device 112, an access control panel 114, and/or a mobile device 116 depending on the particular embodiment. The functions of the management system 104 described herein may be performed by one or more of those devices in various embodiments. For example, in some embodiments, the management server 110 may perform all of the functions of the management system 104 described herein. Further, in some embodiments, the gateway device 112 may be communicatively coupled to the access control device 102 such that the other devices of the management system 104 (e.g., the management server 110, the access control panel 114, and/or the mobile device 116) may communicate with the access control device 102 via the gateway device 112.

In some embodiments, the access control device 102 may communicate with the management server 110 over a Wi-Fi connection and/or with the mobile device 116 over a Bluetooth connection. Additionally, the access control device 102 may communicate with the management server 110 and/or the access control panel 114 via the gateway device 112. As such, in the illustrative embodiment, the access control device 102 may communicate with the gateway device 112 over a Wi-Fi connection and/or a Bluetooth connection, and the gateway device 112 may, in turn, forward the communicated data to the relevant management server 110 and/or access control panel 114. In particular, in some embodiments, the gateway device 112 may communicate with the access control panel 114 over a serial communication link (e.g., using RS-485 standard communication), and the gateway device 112 may communicate with the management server 110 over a Wi-Fi connection, an Ethernet connection, or another wired/wireless communication connection. As such, it should be appreciated that the access control device 102 may communicate with the management server 110 via an online mode with a persistent real-time communication connection or via an offline mode (e.g., periodically or in response to an appropriate condition) depending on the particular embodiment (e.g., depending on whether the access control device 102 is offline). As indicated above, in other embodiments, it should be appreciated that the access control device 102 may communicate with the devices of the management system 104 via one or more other suitable communication protocols.

It should be appreciated that each of the access control device 102, the management system 104, the mobile device 106, the management server 110, the gateway device 112, the access control panel 114, and/or the mobile device 116 may be embodied as one or more computing devices similar to the computing device 200 described below in reference to FIG. 2. For example, in the illustrative embodiment, each of the access control device 102, the management system 104, the mobile device 106, the management server 110, the gateway device 112, the access control panel 114, and the mobile device 116 includes a processing device 202 and a memory 206 having stored thereon operating logic 208 for execution by the processing device 202 for operation of the corresponding device.

It should be further appreciated that, although the management system 104 and the management server 110 are described herein as one or more computing devices outside of a cloud computing environment, in other embodiments, the system 104 and/or server 110 may be embodied as a cloud-based device or collection of devices. Further, in cloud-based embodiments, the system 104 and/or server 110 may be embodied as a "serverless" or server-ambiguous computing solution, for example, that executes a plurality of instructions on-demand, contains logic to execute instructions only when prompted by a particular activity/trigger, and does not consume computing resources when not in use. That is, the system 104 and/or server 110 may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system 104 and/or server 110 described herein. For example, when an event occurs (e.g., data is transferred to the system 104 and/or server 110 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of updated access control data is made by a user (e.g., via an appropriate user interface to the system 104 or server 110), the appropriate virtual function(s) may be executed to perform the actions before eliminating the instance of the virtual function(s).

Although only one access control device 102, one management system 104, one mobile device 106, one management server 110, one gateway device 112, one access control panel 114, and one mobile device 116 are shown in the illustrative embodiment of FIG. 1, the system 100 may include multiple access control devices 102, management systems 104, mobile devices 106, management servers 110, gateway devices 112, access control panels 114, and/or mobile devices 116 in other embodiments. For example, as indicated above, the server 110 may be embodied as multiple servers in a cloud computing environment in some embodiments. Further, each user may be associated with one or more separate mobile devices 106 in some embodiments.

Figure 2:
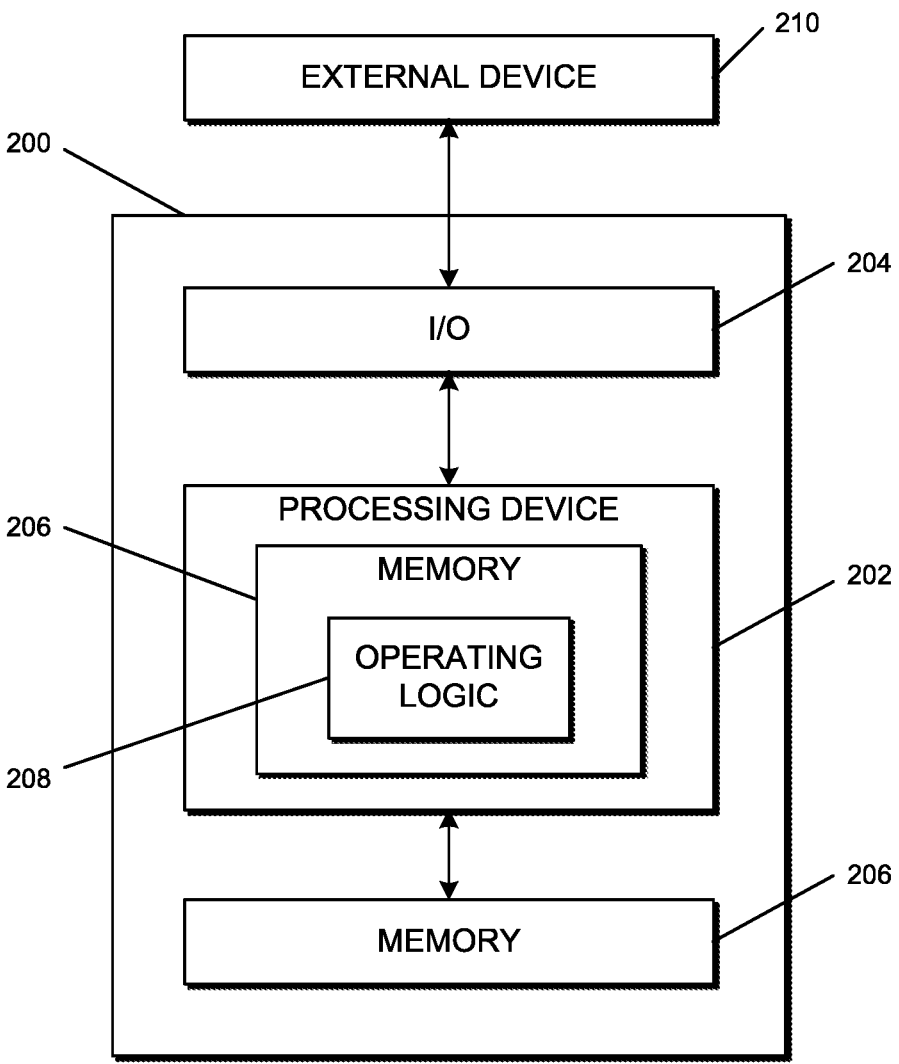
FIG. 2 is a simplified block diagram of at least one embodiment of a computing device.

Referring now to FIG. 2, a simplified block diagram of at least one embodiment of a computing device 200 is shown. The illustrative computing device 200 depicts at least one embodiment of an access control device, mobile device, management server, gateway device, and/or access control panel that may be utilized in connection with the access control device 102, the management system 104, the mobile device 106, the management server 110, the gateway device 112, the access control panel 114, and/or the mobile device 116 illustrated in FIG. 1. Depending on the particular embodiment, computing device 200 may be embodied as a reader device, credential device, access control device, UWB-capable device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the access control device 102, the management system 104, the mobile device 106, the management server 110, the gateway device 112, the access control panel 114, and/or the mobile device 116. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is of a programmable variety that executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable variety, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

It should be appreciated that, in inferring intent, the system 100 may determine a user's intention to walk/pass through a doorway or other passageway as the user approaches so that the system 100 can proactively unlock or open a corresponding barrier. Although a user walking directly toward a passageway at a steady pace may be a straightforward use case to determine user intent, other use cases are more complex (e.g., a user walking down a hallway parallel to the passageway, a user changing speeds and/or directions relative to the passageway, etc.). The technologies described herein may be leveraged to infer user intent in many use cases and provide for a secure and robust access control solution (e.g., rejecting false positives that may be prevalent using various other techniques).

Figure 3:
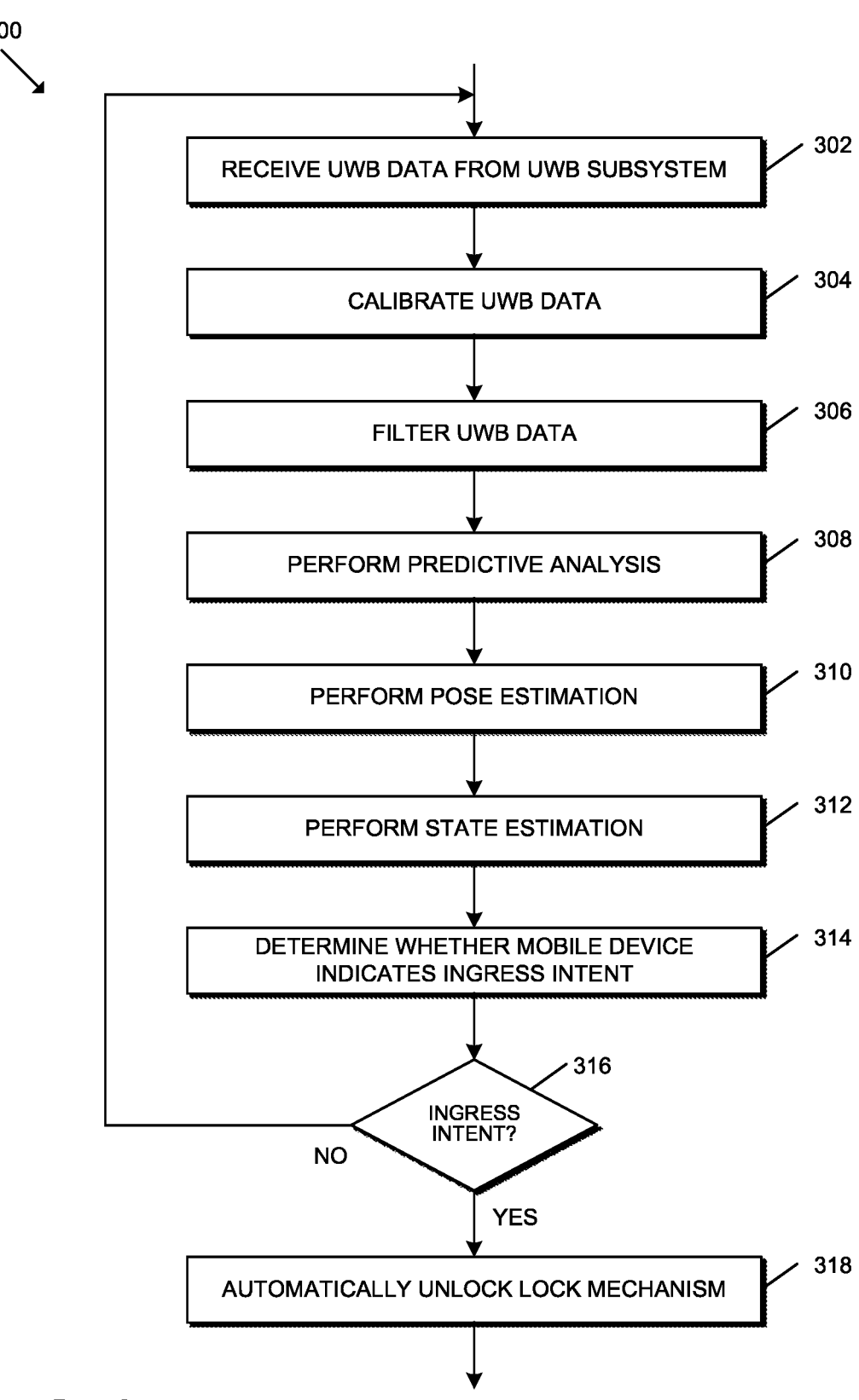
FIG. 3 is a simplified flow diagram of at least one embodiment of a method for ultra wideband-based intent detection for seamless access.

Referring now to FIG. 3, in use, the access control device 102 may execute (e.g., in firmware) a method 300 for UWB-based intent detection for seamless access. It should be appreciated that the particular blocks of the method 300 are illustrated by way of example, and such blocks may be combined or divided, added or removed, and/or reordered in whole or in part depending on the particular embodiment, unless stated to the contrary. As described herein, it should be appreciated that the method 300 (or portions thereof) may be alternatively executed by the mobile device 106 in some embodiments.

The illustrative method 300 begins with block 302 in which the access control device 102 receives UWB data from the UWB subsystem 122 of the access control device 102 (e.g., associated with a UWB ranging session between the access control device 102 and the mobile device 106). In particular, in the illustrative embodiment, the UWB data is indicative of a distance of the mobile device 106 from the access control device 102 and an angle of arrival of the mobile device 106 (e.g., based on an angle of arrival of a UWB signal received from the mobile device 106). In other words, the UWB data from the UWB subsystem 122 includes distance and angle/AoA data. Although described in the singular for convenience and brevity of the description, it should be appreciated that the UWB data may include multiples of the UWB data in various embodiments (e.g., multiple angle/AoA measurements). It should be further appreciated that, in some embodiments, the UWB data from the UWB subsystem 122 may include non-line-of-sight (NLOS) data, signal noise ratio (SNR) data, received signal strength indicator (RSSI) data, and/or other data.

In block 304, the access control device 102 calibrates the UWB data (e.g., the distance and angle data) to address potentially poor data (e.g., due to the particular materials the RF signals are transmitting through, etc.). That is, the access control device 102 may process the raw data from the UWB subsystem 122 and apply a calibration to the data to correct for errors in the data, for example, such that the data can be reliably processed in later phases of the techniques described herein. In some embodiments, the calibration includes applying a distance offset to the distance data and/or applying an angle calibration (e.g., based on look-up table data).

The resultant data of block 304 may include calibrated distance data and/or calibrated angle data.

In block 306, the access control device 102 filters the UWB data (e.g., the distance and angle data received from the UWB subsystem 122) or calibrated/processed versions thereof (e.g., the calibrated distance data and/or the calibrated angle data). In the illustrative embodiment, in filtering the data, the access control device 102 applies median filtering to the data to remove burst noise, which results data that are more reliable. However, it should be appreciated that the access control device 102 may otherwise filter other types of noise and/or characteristics and/or filter burst noise using different filters in other embodiments. Further, the filter window size may vary depending on the particular embodiment. The resultant data of block 306 may include filtered distance data and/or filtered angle data (which may also have been calibrated).

In block 308, the access control device 102 performs predictive analysis on the UWB data (e.g., the distance and angle data received from the UWB subsystem 122) or processed versions thereof (e.g., the calibrated distance/angle data and/or the filtered distance/angle data) to determine/generate expected location data associated with a location of the mobile device 106. For example, in some embodiments, the access control device 102 calculates two-dimensional coordinates (e.g., x and y coordinates) for the predicted location of the mobile device 106 based on the distance and angle data. In doing so, in some embodiments, the access control device 102 may apply a Kalman filter for the detection of outlier or invalid data that can be ignored or replaced with predicted data. In some embodiments, the access control device 102 further receives signal noise ratio (SNR) data and/or non-line-of-sight (NLOS) data (e.g., from the UWB subsystem 122), which may be used to adapt the filter response. In other embodiments, it should be appreciated that the access control device 102 may receive other adaptation parameters that may be used to adapt the filter, determine data validity, and/or otherwise modify the analyses described herein. For example, in some embodiments, the adaptation parameters may include further UWB subsystem parameters received from the UWB subsystem 122. In particular, in an embodiment, an example UWB subsystem parameter may indicate the likelihood that a particular value (e.g., distance, angle, etc.) generated by the UWB subsystem 122 is valid (e.g., with a value from 0 to 100), which may be used to improve data validity analyses. The resultant data of block 308 may include the sample rate (e.g., 100 ms), angle (e.g., in the same and/or converted units), distance (e.g., in the same and/or converted units), raw coordinates from direct calculation using the raw UWB distance/angle data (e.g., raw-x and raw-y coordinates), filtered coordinates from calculation using the filtered distance/angle data (e.g., filtered-x and filtered-y coordinates), coordinate outputs from the Kalman filter (e.g., x and y coordinates), and/or a data validity flag (e.g., set to false if there is a significant amount outliers or poor data). Although described in reference to a Kalman filter, it should be appreciated that the access control device 102 may use an alternative dead reckoning or path prediction filter or algorithm in other embodiments.

In block 310, the access control device 102 performs pose estimation based on the UWB data (e.g., using processed versions thereof) to determine a velocity, course/heading, and/or heading slope of the mobile device 106. In particular, in some embodiments, access control device 102 determines the velocity, course/heading, and/or heading slope of the mobile device 106 based on the sample rate (or time since the last UWB data sample) and the coordinate outputs from the Kalman filter. It should be appreciated that the velocity may be calculated as the average velocity of the mobile device 106 based on the coordinates and the sample rate, and the heading slope may be calculated as the change in y coordinates over the absolute value of the change in x coordinates (e.g., which may give a general indication of whether the user is heading toward the passageway). It should be further appreciated that the access control device 102 maintains historical data for location data and/or values calculated in the method 300. The resultant data of block 310 may include the velocity (e.g., average velocity), heading slope, and/or course of the mobile device 106.

In block 312, the access control device 102 performs state estimation to calculate and/or evaluate various thresholds and/or scalars associated with the location, velocity, and/or heading of the mobile device 106 relative to the passageway. In some embodiments, the access control device 102 calculates various parameters that describe the state of the mobile device 106 (and, therefore, the corresponding user) including a target associated with the passageway and distance thresholds based on the coordinates, velocity, heading, and/or other data associated with the mobile device 106. In particular, in some embodiments, the access control device 102 calculates a target width scalar based on an angle of the mobile device 106 from the target center, a velocity distance scalar based on the velocity (e.g., average velocity) of the mobile device 106, and/or other data. Further, the access control device 102 may determine whether the mobile device 106 has a heading that is on course toward the target (e.g., based on a dynamic target) and/or whether the mobile device 106 is within a predefined intent distance from the secure passageway and/or a secure distance threshold from the passageway that dynamically changes based on the velocity of the mobile device 106. The resultant data of block 312 may include a target width scalar, a velocity distance scalar, an indication of whether the mobile device 106 is within a predefined intent distance threshold, an indication of whether the mobile device 106 is within a dynamic secure distance threshold, and/or an indication of whether the mobile device 106 is on course to the passageway.

Figure 4:
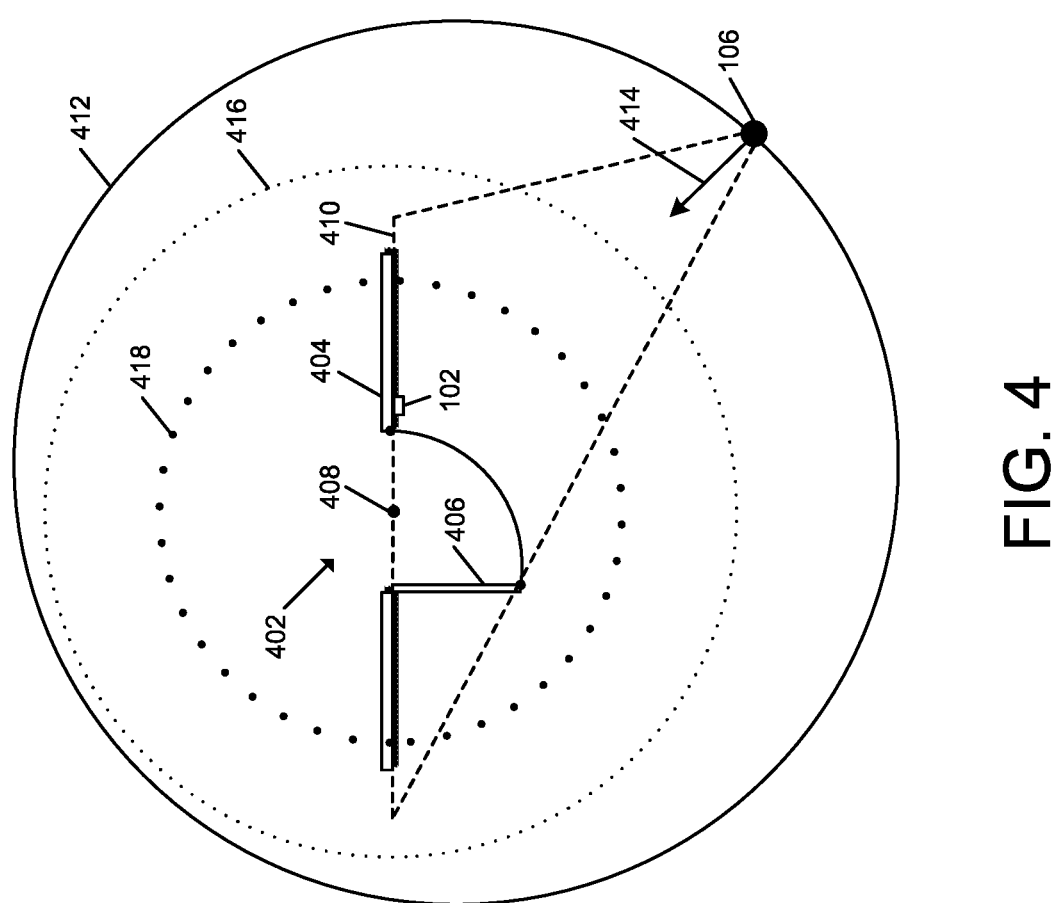
FIG. 4 is a simplified illustration of spatial relationships of a mobile device relative to a passageway.

FIG. 4 depicts a passageway 402 defined in a wall 404 and secured by a door 406. The illustrative access control device 102 of FIG. 4 is secured to the wall 404 nearby the passageway 402. Accordingly, in some embodiments, it should be appreciated that the access control device 102 may be embodied as a wall-mounted reader, UWB accessory device, electric strike, and/or other wall-mounted access control device. It should be further appreciated that coordinates of the center point 408 of the passageway may be predefined and/or otherwise known or calculable to the access control device 102. Accordingly, as described above, the access control device 102 computes a target width scalar based on the approach angle of the mobile device 106 that is multiplied by a base target size to determine a width of a target 410. For example, in an embodiment, if a user's course is zero degrees toward the center point 408 of the target 410, the scaler may be 1.0, and as the user's course deviates from zero degrees (e.g., increases in either direction), the scalar increases. Accordingly, the target 410 is dynamic in the sense that the size of the target 410 is dependent on the approach angle of the mobile device 106 and, therefore, may vary over time. The mobile device 106 is located at a current distance 412 away from the passageway (e.g., from the center point 408 or the access control device 102 depending on the particular embodiment) and has the determined heading 414. The access control device 102 may determine whether the mobile device 106 is "on course" by determining whether the heading 414 would be projected onto the target 410, as would be the case in the embodiment of FIG. 4.

As indicated above, the access control device 102 also determines whether the mobile device 106 is within a predefined intent distance 416 and/or a dynamic secure distance 418 from the passageway (e.g., from the center point 408 or the access control device 102 depending on the particular embodiment). It should be appreciated that the predefined intent distance 416 may be predefined in the access control device 102 (e.g., as a static or configurable parameter). In the illustrative embodiment, if the mobile device 106 is outside of the predefined intent distance 416, further intent analyses are ignored to save on processing, etc. In other words, the user intent may be ignored or never determined if the mobile device 106 is outside of the predefined intent distance 416. As described above, the access control device 102 also calculates a velocity distance scalar based on the velocity of the mobile device 106 that is multiplied by a base distance to determine a dynamic secure distance 418. Accordingly, the secure distance 418 is dynamic in the sense that the secure distance 418 is dependent on the velocity (e.g., average velocity) of the mobile device 106 and, therefore, may vary over time. In particular, as the velocity of the mobile device 106 increases, the secure distance 418 increases. In some embodiments, ingress intent is generally not inferred unless the mobile device 106 is within the dynamic secure distance 418.

Figure 5:
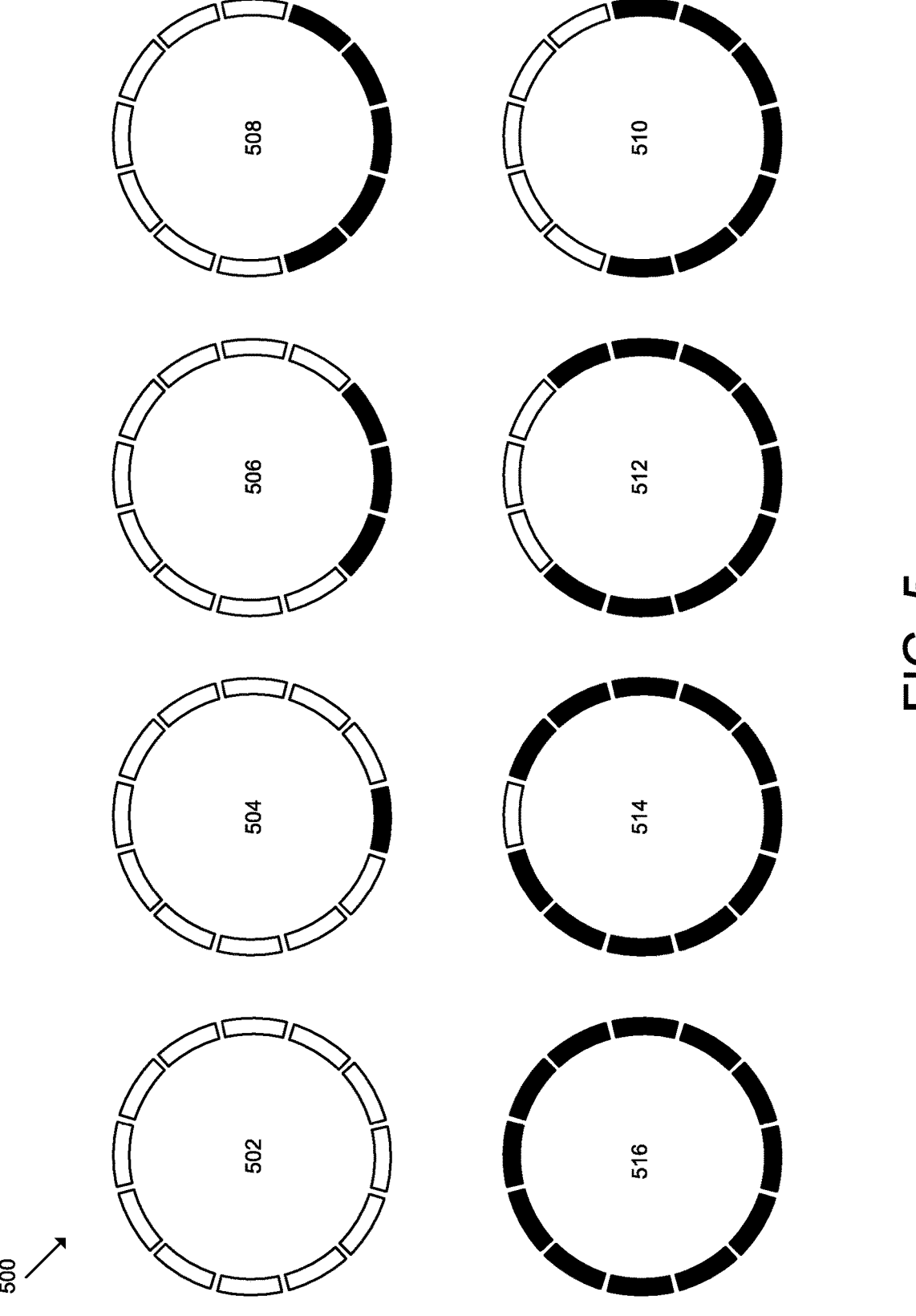
FIGS. 5-7 are simplified illustrations of a graphical user interface depicting a light ring that conveys various information to an approaching user.

Referring back to FIG. 3, in block 314, the access control device 102 determines whether the dynamics of the mobile device 106 are indicative of ingress intent. In particular, in some embodiments, the access control device 102 may rely on various parameters/values calculated from other phases of the method 300 described above to infer whether the user of the mobile device 106 has ingress intent. For example, the access control device 102 may determine whether the mobile device 106 has been moving consistently with a heading toward the passageway or the center point 408 of the target 410 (e.g., for at least a threshold distance traversed and/or threshold period of time elapsed), and whether the mobile device 106 has passed (and is now within) the secure distance threshold. If so, the access control device 102 may infer ingress intent. More specifically, in some embodiments, the access control device 102 makes the determination of ingress intent based on the intent distance threshold, the secure distance threshold, the determination regarding whether the mobile device 106 is "on course," the change is distance from the last-calculated distance point, and/or the data validity flag. Further, in some embodiments, it should be appreciated that the access control device 102 may determine an ingress progress value indicative of a likelihood that the user is walking toward the passageway (e.g., expressed as a percentage, value between 0 and 1, or otherwise), which may be used by a graphical user interface or display interface of the access control device 102 to provide feedback to the user as the user is walking nearby the access control device 102 (see, for example, FIG. 5). Accordingly, in the various embodiments, the resultant data of block 314 may include an ingress intent determination and/or an ingress progress value. It should further appreciated that, in some embodiments, the access control device 102 may utilize a "distance only" fallback mode. In such an embodiment, if the access control device 102 has "lost track" of the mobile device 106 as the mobile device 106 approached the passageway but the mobile device 106 is now detected within the secure distance threshold and has been stationary for at least a threshold period of time, the access control device 102 may infer ingress intent.

If the access control device 102 determines, in block 316, that ingress intent has not been inferred, the method 300 returns to block 302 in which the access control device 102 again receives UWB data from the UWB subsystem 122 (e.g., after expiration of a corresponding sample period) to re-execute blocks 304-314 with the new UWB data. However, if the access control device 102 determines, in block 316, that ingress intent has been inferred, the method 300 advances to block 318 in which the access control device 102 may automatically unlock the lock mechanism 120 or transmit instructions to the lock mechanism 120 (or a device including the lock mechanism 120) to unlock depending on the particular embodiment. Although not described herein for simplicity and brevity of the description, it should be appreciated that the access control device 102 may also receive a wireless access credential from the mobile device 106 (e.g., via a suitable wireless communication protocol) and evaluate the wireless access credential to ensure that the user of the mobile device 106 is authorized to gain access to the passageway.

Although the blocks 302-318 are described in a relatively serial manner, it should be appreciated that various blocks of the method 300 may be performed in parallel in some embodiments. Additionally, although the method 300 is described primarily in reference to inferring a user's intent to gain access to a passageway as the user approaches the passageway, it should be appreciated that similar techniques may be employed to automatically lock a lock mechanism 120 and/or otherwise secure a passageway as the user departs the passageway.

Although the techniques described herein are primarily in reference to two-dimensional calculations, it should be appreciated that the three-dimensional data may be used in some embodiments. For example, in some circumstances, the elevation of the mobile device 106 may skew the data as used herein. Accordingly, in some embodiments, the access control device 102 may project a three-dimensional data point to two-dimensional space (e.g., the plane of the access control device 102 extending outward horizontally) or otherwise convert three-dimensional data points to two-dimensional data points in order to provide further robustness (e.g., during and/or after the calibration phase described herein).

Additionally, although described in reference to the access control device 102, it should be appreciated that the mobile device 106 may perform one or more of the functions (e.g., all of the functions) described in reference to the method 300 of FIG. 3 in some embodiments. In such embodiments, it should be appreciated that the access control device 102 may further leverage sensor data as indicated above and/or artificial intelligence technologies (e.g., machine learning). Further, in some embodiments, the system 100 may include multiple access control devices 102 and/or other devices that function in concert to provide more robust UWB-based locational triangulation of the mobile device 106.

In some embodiments, the access control device 102 may leverage an adaptive intent algorithm that utilizes parameters such as historical average velocities to tune the algorithms described herein for specific users based on the particular mobile device 106 (e.g., by MAC address or credential identifier). For example, the access control device 102 may utilize data such as that a child typically moves faster than an octogenarian for dynamically assessing ingress intent. Further, in some embodiments, machine learning techniques may be used to learn of "hot spots" frequently traversed by users by tracking each user's movements and associating the path taken with an unlocking/opening of a door. For example, in some embodiments, such features may be used to ignore users who do not travel on learned paths or hot spots. Further, in some embodiments, the system 100 may allow for augmented reality to be used (e.g., by a camera of a mobile device) in order to set up hot spots and/or calibration data (e.g., allowing the drawing of a box around desired "dead zones").

It should be further appreciated that the access control device 102 may provide audible or visual feedback to the user as the user moves nearby and/or interacts with the system 100. In particular, the access control device 102 may include a display device that displays a graphical user interface with feedback to the user of the mobile device 106 (e.g., indicating that the user is being tracked by the access control device 102 and/or to otherwise convey information to the user). For example, the display device may be embodied as or include LEDs, a display screen, a light ring (or other shape), and/or another indicator device.

As indicated above, the access control device 102 may determine an ingress progress value indicative of a likelihood that the user is walking toward the passageway. In some embodiments, the access control device 102 may display a light ring with various lighted segments illuminated to convey the ingress progress value as shown in the sequence 500 of FIG. 5. As the likelihood that the user is walking toward the passageway increases, the ingress progress value likewise increases, which may result in a greater number of light segments being illuminated (or changing color) as shown in the iterations 502-516 of the sequence 500 of FIG. 5.

Figure 6:
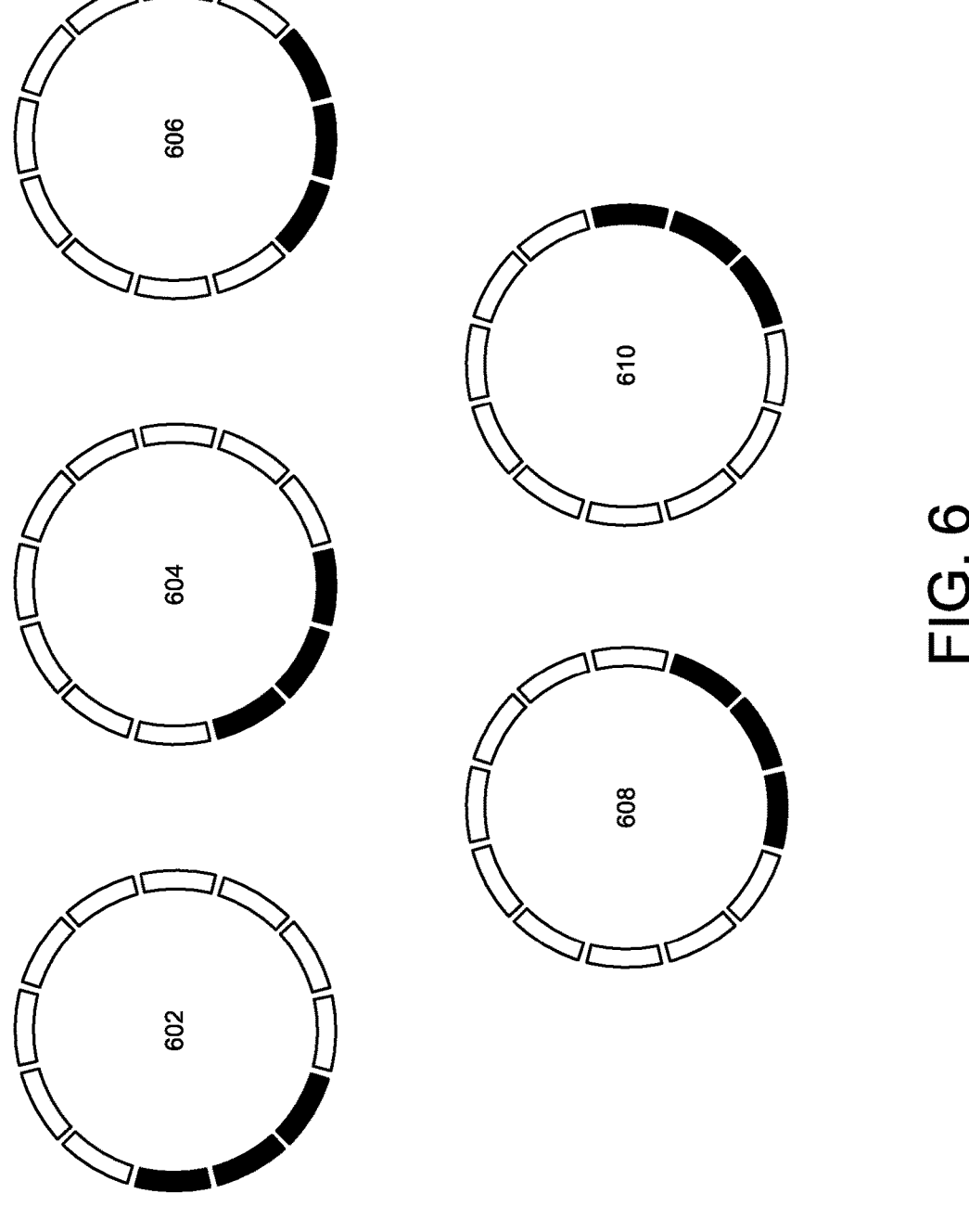
Figure 7:
Figure 7:
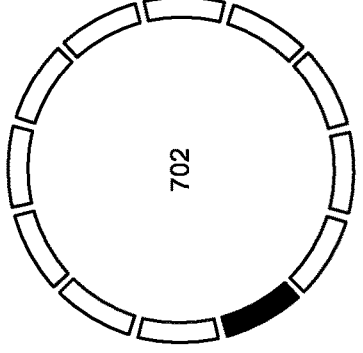
Figure 7:
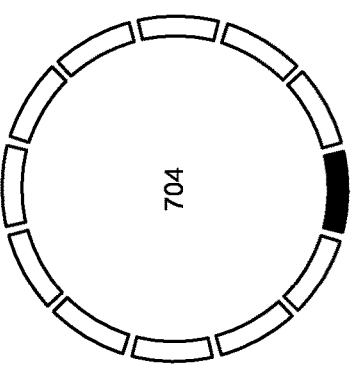
Figure 7:
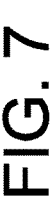
Figure 7:
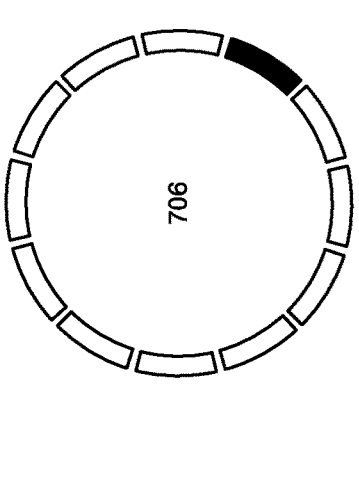

Further, in some embodiments, a light ring may be illuminated to convey the approach angle of the user relative to the passageway as shown in the sequence 600 of FIG. 6 or the sequence 700 of FIG. 7. As shown, the sequence 600 of FIG. 6 involves illuminating three adjacent light segments to indicate the approach angle, whereby the iterations 602-610 indicate by way of example that the user is moving from left to right. The sequence 700 of FIG. 7 involves illuminating one light segment to indicate the approach angle, whereby the iterations 702-706 indicate that the user is moving from left to right. It should be further appreciated that the color of the illuminated light segment may change (e.g., from blue to red) if the user is approaching the passageway from an undesirable angle. Further, in some embodiments, the light ring may be configured to convey both the ingress progress value and the approach angle simultaneously. For example, in an embodiment, the number of lighted segments may indicate the ingress progress value, and a different colored lighted segment may indicate the approach angle.

In some embodiments, feedback to the user may guide the user to an optimal position for tracking purposes and/or indicate to the user that the RF performance is poor (e.g., recommending that the user remove the mobile device 106 from potential RF interference, such as from the user's purse or pocket).

What is claimed is:

1. A method, comprising:

receiving, from an ultra wideband (UWB) subsystem of an access control device, UWB data indicative of a distance of a mobile device from the access control device and an angle of arrival of a UWB signal from the mobile device, wherein the access control device comprises a light display positioned on an outer surface of the access control device and having a plurality of light segments;

performing, by the access control device, predictive analysis on the UWB data to generate expected location data associated with a location of the mobile device;

determining, by the access control device, a velocity of the mobile device and a heading of the mobile device based on the UWB data;

determining, by the access control device, whether the mobile device is on course to a dynamic target associated with a passageway secured by the access control device based on the velocity and the heading of the mobile device, wherein a width of the dynamic target is a function of a velocity of the mobile device and an angle of the mobile device relative to a center of the dynamic target;

performing, by the access control device, state estimation to determine whether the mobile device is within a secure distance threshold from the passageway, wherein the secure distance threshold dynamically changes based on the velocity of the mobile device;

inferring, by the access control device, ingress intent of a user of the mobile device in response to determining that the mobile device is within the secure distance threshold and on course to the passageway;

selecting, by the access control device, a number of the plurality of light segments to illuminate based on the distance of the mobile device from the access control device; and illuminating, by the access control device, the selected number of light segments.

2. The method of claim 1, further comprising calibrating the UWB data with a distance offset and an angle calibration.

3. The method of claim 1, further comprising filtering the UWB data to remove burst noise.

4. The method of claim 1, wherein determining the velocity of the mobile device comprises determining an average velocity of the mobile device.

5. The method of claim 1, wherein determining the velocity of the mobile device comprising determining the velocity of the mobile device based on historical location data calculated for the mobile device.

6. The method of claim 1, wherein the UWB data comprises signal noise ratio (SNR) data and non-line-of-sight (NLOS) data, and further comprising:

adapting a filter response of at least one of a dead reckoning filter or a path prediction filter based on the SNR data and the NLOS data; and applying the at least one of the dead reckoning filter or the path prediction filter to generate the expected location data.

7. The method of claim 1, further comprising applying a Kalman filter to detect outlier data in the UWB data and removing the outlier data from the UWB data to generate filtered UWB data; and wherein performing the predictive analysis on the UWB data to generate the expected location data comprises performing the predictive analysis on the filtered UWB data to generate the expected location data.

8. The method of claim 1, further comprising applying a Kalman filter to detect outlier data in the UWB data and replacing the outlier data in the UWB data with predicted data to generate filtered UWB data; and wherein performing the predictive analysis on the UWB data to generate the expected location data comprises performing the predictive analysis on the filtered UWB data to generate the expected location data.

9. The method of claim 1, wherein determining the velocity of the mobile device comprises determining a historical average velocity of the mobile device stored in association with a MAC address of the mobile device.

10. The method of claim 1, wherein inferring ingress intent of the user of the mobile device further comprises determining whether the mobile device has maintained a consistent heading toward the passageway for at least a threshold period of time elapsed.

11. The method of claim 1, wherein inferring ingress intent of the user of the mobile device further comprises determining whether the mobile device has maintained a consistent heading toward the passageway for at least a threshold distance traversed by the mobile device.

12. An access control device, comprising:

an ultra wideband (UWB) subsystem configured to perform a ranging session with a mobile device and generate UWB data indicative of a distance of the mobile device from the access control device and an angle of arrival of a UWB signal from the mobile device;

a light display positioned on an outer surface of the access control device and having a plurality of light segments;

a processor; and a memory comprising a plurality of instructions stored thereon that, in response to execution by the processor, causes the processor to:

receive the UWB data from the UWB subsystem;

perform predictive analysis on the UWB data to generate expected location data associated with a location of the mobile device;

determine a velocity of the mobile device and a heading of the mobile device based on the UWB data;

determine whether the mobile device is on course to a dynamic target associated with a passageway secured by the access control device based on the velocity and the heading of the mobile device, wherein a width of the dynamic target is a function of a velocity of the mobile device and an angle of the mobile device relative to a center of the dynamic target;

perform state estimation to determine whether the mobile device is within a secure distance threshold from the passageway, wherein the secure distance threshold dynamically changes based on the velocity of the mobile device;

infer ingress intent of a user of the mobile device in response to determining that the mobile device is within the secure distance threshold and on course to the passageway;

select a number of the plurality of light segments to illuminate based on the distance of the mobile device from the access control device; and illuminate the selected number of light segments.

13. The access control device of claim 12, wherein the plurality of instructions further causes the processor to calibrate the UWB data with a distance offset and an angle calibration.

14. The access control device of claim 12, wherein the plurality of instructions further causes the processor to filter the UWB data to remove burst noise.

15. The access control device of claim 12, wherein to determine the velocity of the mobile device comprises to determine an average velocity of the mobile device.

16. The access control device of claim 12, wherein to determine the velocity of the mobile device comprising to determine the velocity of mobile device based on historical location data calculated for the mobile device.

17. The access control device of claim 12, further comprising a lock mechanism configured to unlock in response to inferred ingress intent of the user.

18. The access control device of claim 12, wherein the plurality of instructions further causes the processor to:

select a color of illumination for the light-ring segments based on whether the angle of arrival of the UWB signal from the mobile device is within a predefined angle threshold; and illuminate the selected number of light-ring segments with the selected color of illumination.

19. A method, comprising:

receiving, from an ultra wideband (UWB) subsystem of a mobile device, UWB data indicative of a distance of the mobile device to an access control device and an angle of arrival of a UWB signal from the access control device, wherein the access control device comprises a light display positioned on an outer surface of the access control device and having a plurality of light segments;

performing, by the mobile device, predictive analysis on the UWB data to generate expected location data associated with a location of the mobile device relative to the access control device;

determining, by the mobile device, a velocity of the mobile device and a heading of the mobile device based on the UWB data;

determining, by the mobile device, whether the mobile device is on course to a dynamic target associated with a passageway secured by the access control device based on the velocity and the heading of the mobile device, wherein a width of the dynamic target is a function of a velocity of the mobile device and an angle of the mobile device relative to a center of the dynamic target;

performing, by the mobile device, state estimation to determine whether the mobile device is within a secure distance threshold from the passageway, wherein the secure distance threshold dynamically changes based on the velocity of the mobile device;

inferring, by the mobile device, ingress intent of a user of the mobile device in response to determining that the mobile device is within the secure distance threshold and on course to the passageway;

select a number of the plurality of light segments to illuminate based on the distance of the mobile device from the access control device; and illuminate the selected number of light segments.

* * * * *